United States Patent [19]
Enderle

[11] Patent Number: 6,123,368
[45] Date of Patent: Sep. 26, 2000

[54] TWO-STEP, DIFFERENTIAL DIAMETER WEDGE THREADED CONNECTOR

[75] Inventor: Doug Enderle, Humble, Tex.

[73] Assignee: Hydril Company, Houston, Tex.

[21] Appl. No.: 09/044,596

[22] Filed: Mar. 19, 1998

[51] Int. Cl.[7] ...................................................... F16L 25/00
[52] U.S. Cl. ............................................................. 285/334
[58] Field of Search ..................................... 285/333, 334, 285/355, 390

[56] References Cited

U.S. PATENT DOCUMENTS

| | | | |
|---|---|---|---|
| Re. 30,647 | 6/1981 | Blose | 285/334 |
| Re. 34,467 | 12/1993 | Reeves | 285/334 |
| 4,346,920 | 8/1982 | Dailey | 285/334 |
| 4,671,544 | 6/1987 | Ortloff | 285/334 |
| 4,688,832 | 8/1987 | Ortloff et al. | 285/334 |
| 4,703,954 | 11/1987 | Ortloff et al. | 285/334 |
| 4,705,307 | 11/1987 | Chelette | 285/334 |
| 4,753,460 | 6/1988 | Tung . | |
| 4,822,081 | 4/1989 | Blose . | |
| 4,917,409 | 4/1990 | Reeves . | |
| 5,338,074 | 8/1994 | Barringer et al. | 285/334.4 |
| 5,358,289 | 10/1994 | Banker et al. | 285/334 |

*Primary Examiner*—Eric K. Nicholson
*Attorney, Agent, or Firm*—Rosenthal & Osha L.L.P.

[57] ABSTRACT

A threaded pipe connection is disclosed that includes a box member and a pin member. The box member has a tapered, internal, generally dovetail-shaped thread incorporated in a two-step wedge configuration such that there exists a smaller step and a larger step each with stab flanks, load flanks, roots, and crests. The internal thread has a beginning and an end and increases in width in one direction. The pin member also has a tapered, external, generally dovetail-shaped thread incorporated in a two-step wedge configuration such that there exists a smaller step and a larger step each with stab flanks load flanks, roots, and crests. The external thread increases in width in the other direction so that the complementary flanks of the respective threads move into engagement during rotational make-up of the connection and form sealing surfaces that resist the flow of fluids between the threads on the smaller step of the box member and the smaller step of the pin member upon rotational make-up of the connection, while leaving clearance between the threads on the larger step of the box member and the larger step of the pin member upon rotational make-up of the connection.

14 Claims, 14 Drawing Sheets

TWO-STEP, DIFFERENTIAL DIAMETER WEDGE THREADED CONNECTOR

FIELD OF THE INVENTION

The present invention involves threaded tubular joints usable in oil and gas well drilling and production, such as tubing, casing, line pipe, and drill pipe, commonly known collectively as oilfield tubular goods. More particularly, the invention relates to a tubular joint for connecting male (pin) and female (box) members.

BACKGROUND OF THE INVENTION

The use of threaded tubular connections for joining flow conduits in an end-to-end relationship to form a continuous flow path for transporting fluid under pressure is well known. Oilfield tubular goods all use threaded connections for connecting adjacent sections of conduit or pipe. Examples of such threaded end connections designed for use on oilfield tubular goods are disclosed in U.S. Pat. Nos. 2,239,942; 2,992,019; 3,359,013; RE 30,647; and RE 34,467, all of which are assigned to the assignee of the present invention.

In U.S. Pat. No. RE 30,647 by Blose, a particular thread form or structure is disclosed for a tubular connection that provides an unusually strong joint while controlling the stress and strain in connected pin and box members within acceptable levels. The pin member is equipped with at least one generally dovetail-shaped external thread whose width increases in one direction along the pin, while the box member is equipped with at least one matching generally dovetail-shaped internal thread whose width increases in the other direction. In this manner, the mating set of helical threads provide a wedge-like engagement of opposing pin and box flanks that limit the extent of relative rotation between the pin and box members, and define a forcible make-up condition that completes the connection. In this thread structure, the flank shoulder angles as well as the thread width can be used to control the stress and strain preload conditions induced in the pin and box members for a given make-up torque. Thus, by tailoring the thread structure to a particular application or use, the tubular connection or joint is limited only by the properties of the materials selected.

The wedge thread has been proven to be a reliable sealing mechanism in threaded connections. The dovetail, wedging action of the threads create sufficient interference in roots, crest, load flanks, and stab flanks to effect the thread seal. However, the thread diameter interference required to effect a pressure seal causes extreme tangential (hoop) stresses in the thin section of the box member.

U.S. Pat. No. RE 34,467 by Reeves discloses an improvement to the thread structure disclosed in the Blose reissue patent and specifically addresses the potential for false torque readings in the joint resulting from trapped thread lubricant in the clearance between the roots and crests of the threads. Reliance in the torque readings developed by the forcible make-up of the connection are necessary to insure that the design stress and strain preload conditions actually exist in the connection. Thus, the Reeves reissue patent discloses a thread structure whereby the box and pin threads are tapered, in addition to having thread widths that increase in opposite directions, so that the roots, crests, and flanks of the threads are moved into engagement as the joint is made up. The threads are particularly designed so that the complementary roots and crests move into engagement before both of the opposing stab and load flanks move into engagement, whereby the volume of lubricant in the clearance between the roots and crests is substantially reduced. In this manner, most of the thread lubricant is displaced to the helical clearance between the opposing load flanks and forms a long, very thin ribbon that has little if any effect on the proper make-up of the connection or the ability of the thread surfaces to form seals as they are moved together.

Because of imperfections in the machined thread surfaces that form the seals in a thread seal connection like the threads described in the Reeves reissue patent, thread lubricant can become isolated between sealing surfaces within the tubular connection. Once rotation between the pin and box members has advanced until the thread lubricant entirely fills the isolated volume between the pin and box members, additional rotation will produce an increase in the pressure of the lubricant. This increased pressure can result in higher tangential (hoop) and radial stresses in the connection, particularly in harsh cold weather environments, such as the North Sea, which cause the lubricant to become hardened and more viscous.

As shown in FIG. 1, prior art connection 10 includes a pin member 11 and a box member 12. Box member 12 has tapered, internal, generally dovetail-shaped thread structure 14 formed thereon and adapted for engaging a complementary tapered, external, generally dovetail-shaped thread structure 15 formed on pin member 11 to mechanically secure the box and pin members in a releasable manner.

Internal thread 14 of box member 12 has stab flanks 18, load flanks 16, roots 20, and crests 24. The thread increases in width progressively at a uniform rate in one direction substantially the entire helical length of thread 14. External thread 15 of pin member 11 has stab flanks 19, load flanks 17, roots 21, and crests 25. The thread increases in width progressively at a uniform rate in the other direction substantially the entire helical length of thread 15. The oppositely increasing thread widths and the taper of threads 14 and 15, cause the complementary flanks, roots, and crests of the respective threads to move into forcible engagement during rotational make-up of the connection and form sealing surfaces that resist the flow of fluids between the threads upon rotational make-up of the connection.

The pin member 11 or the box member 12 defines the longitudinal axis 13 of the made-up connection 10. The roots and crests of the box and pin members are flat and parallel to the longitudinal axis of the connection and have sufficient width to prevent any permanent deformation of the threads when the connection is made up.

SUMMARY OF THE INVENTION

In general, in one aspect, a threaded pipe connection is disclosed having a box member and a pin member. The box and pin members are formed in a two-step configuration which provides a larger step and a smaller step. The box member has a tapered, internal, generally dovetail-shaped thread with stab flanks, load flanks, roots, and crests. The internal thread has a beginning and an end and increases in width in one direction on both the larger step and the smaller step. The pin member also has a tapered, external, generally dovetail-shaped thread with stab flanks, load flanks, roots, and crests. The external thread increases in width in the other direction on both the larger step and the smaller step so that the complementary flanks of the respective threads move into engagement during rotational make-up of the connection and form sealing surfaces that resist the flow of fluids between the threads on the smaller step of the box member and the pin member upon rotational make-up of the connection, while leaving clearance between the threads on the larger step of the box member and the pin member.

In accordance with one or more embodiments of the present invention, the inner and outer threads are tapered so that the complementary roots and crests move into engagement during rotational make-up of the connection and form sealing surfaces between the threads on the smaller step of the box member and the pin member that resist the flow of fluids between the threads upon rotational make-up of the connection, while leaving clearance between the threads on the larger step of the box member and the pin member. The roots and crests of the box and pin members are flat and parallel to a longitudinal axis of the connection. The roots and crests of the box and pin members have sufficient width to prevent any permanent deformation of the threads when the connection is made up. The roots and crests are adapted to move into engagement before both the load flanks and stab flanks move into engagement to complete the sealing of the connection. The stab flanks and load flanks are moved into engagement as the pin member is moved into the box member by relative rotation of said members, the roots and crests are moved into engagement during rotational make-up of the connection, and the other of the stab flanks and load flanks are moved into engagement upon rotational make-up of the connection. The stab flanks are moved into engagement as the pin member is moved into the box member by relative rotation of the members, the roots and crests are moved into engagement during rotational make-up of the connection, and the load flanks move into engagement upon rotational make-up of the connection.

In general, in one aspect, a method of reducing stress in a threaded pipe connection is disclosed including, providing a box member having a tapered, internal, generally dovetail shaped thread incorporated in a two-step wedge configuration such that there exists a smaller step and a larger step each with stab flanks, load flanks, roots, and crests, the internal thread having a beginning and an end and increasing in width in one direction and providing a pin member having a tapered, external, generally dovetail shaped thread incorporated in a two-step wedge configuration such that there exists a smaller step and a larger step each with stab flanks, load flanks, roots, and crests, the external thread increasing in width in the other direction.

In accordance with one or more embodiments of the invention, the complementary flanks of the respective threads move into engagement during rotational make up of the connection, and form sealing surfaces that resist flow of fluids between the threads on the smaller step of the box member and the pin member upon rotational make up of the connection, while leaving clearance between the threads on the larger step of the box member and the pin member upon rotational make-up of the connection. The method includes providing tapered inner and outer threads so that the complementary roots and crests move into engagement during rotational make up of the connection and form sealing surfaces that resist the flow of fluids between the threads on the smaller step of the box member and the pin member upon rotational make up of the connection, while leaving clearance between the threads on the larger step of the box member and the pin member. The method includes providing the roots and crests of the larger and smaller steps of the box and pin members flat and parallel to a longitudinal axis of the connection. The method includes providing the roots and crests of the larger and smaller steps of the box and pin members with sufficient width to prevent any permanent deformation of the threads when the connection is made up. The method includes adapting the roots and crests to move into engagement before both the load flanks and stab flanks move into engagement to complete the sealing of the connection. The method includes moving one of the stab flanks and load flanks into engagement as the pin member is moved into the box member by relative rotation of the members, moving the roots and crests into engagement during rotational make up of the connection and moving the other of the stab flanks and load flanks into engagement upon rotational make up of the connection. The method includes moving the stab flanks into engagement as the pin member is moved into the box member by relative rotation of the members, moving the roots and crests into engagement during rotational make up of the connection and moving the load flanks into engagement upon rotational make up of the connection.

Advantages may include one or more of the following. By incorporating a two-step wedge profile, thread diameter interference can be left in the smaller step threads creating a pressure seal, while allowing thread diameter clearance in the larger step threads. With the smaller step threads providing the pressure seal, the larger step threads are allowed to provide structural support to the connector without a requirement for containing pressure. Other advantages and features will become apparent from the following description including the drawings and claims.

DETAILED DESCRIPTION

Figure 1:
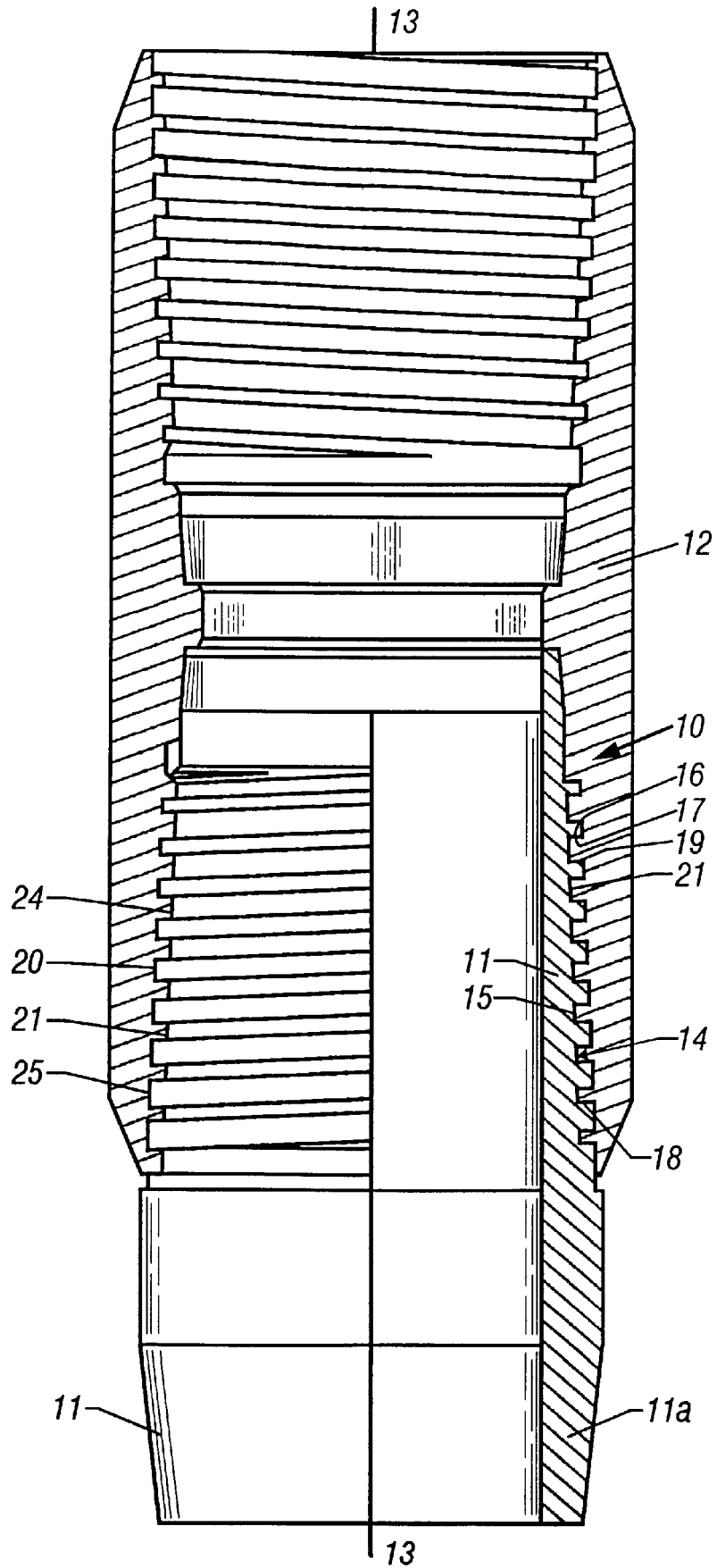
FIG. 1 is side view, partially in section, of a prior art tubular joint.
Figure 2:
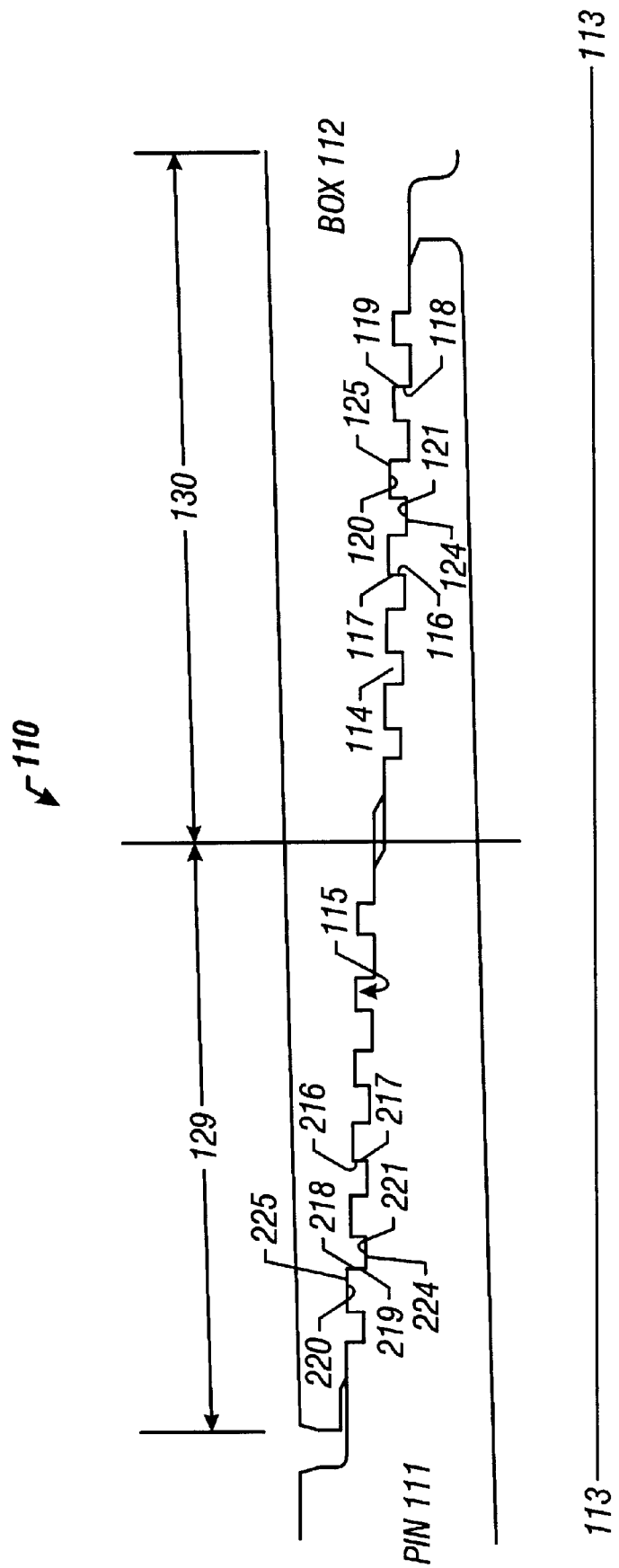
FIG. 2 is a side view of a made-up pin member external thread structure and a box member internal thread structure with enlarged cross-sections at a point in the thick and thin sections of the box member in accordance with an embodiment of,the invention.
Figure 3:
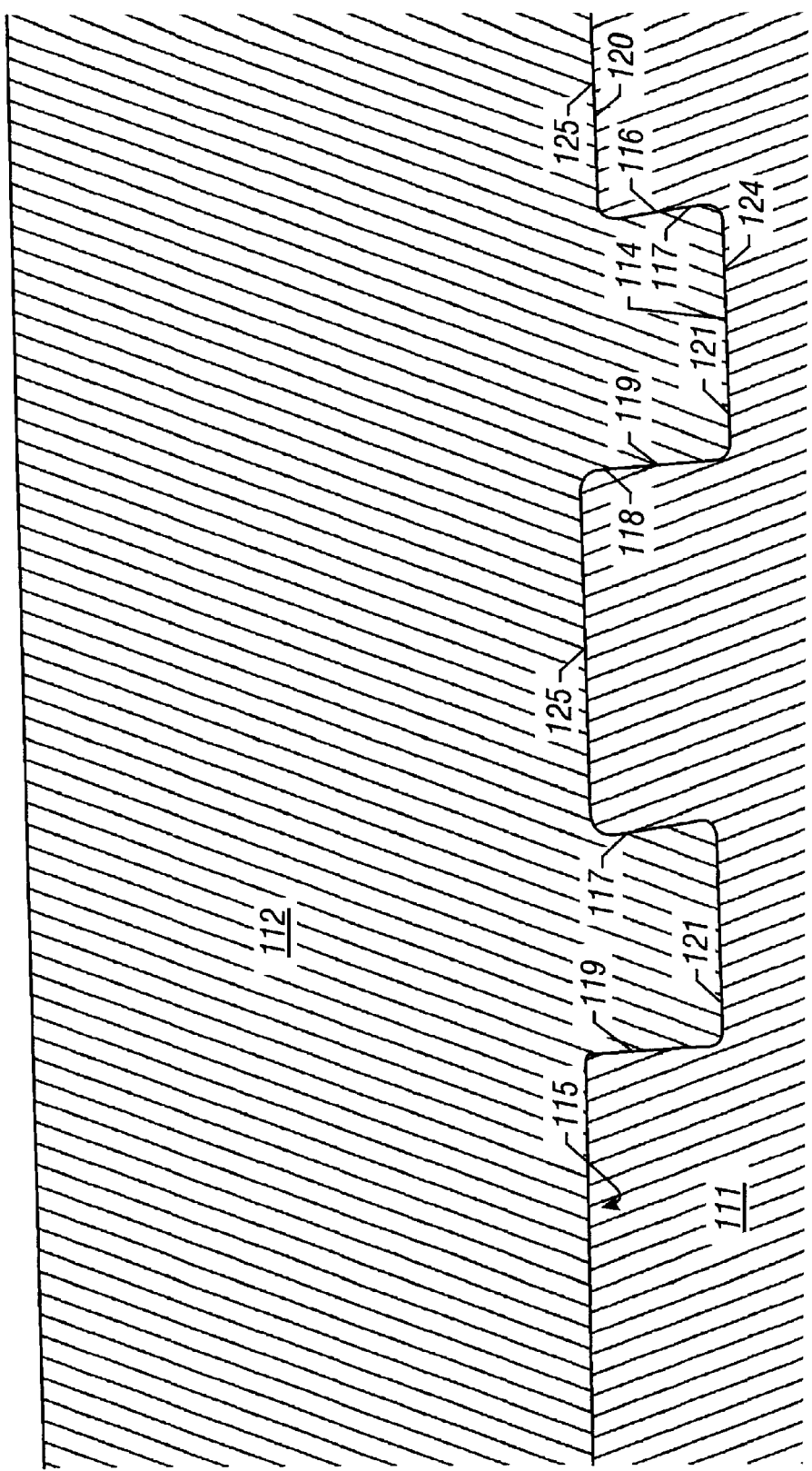
FIG. 3 is an enlarged cross-section of a tubular joint in accordance with an embodiment of the invention at the point of engagement between a pin member crest and a box member root in the thick section of the box member.
Figure 4:
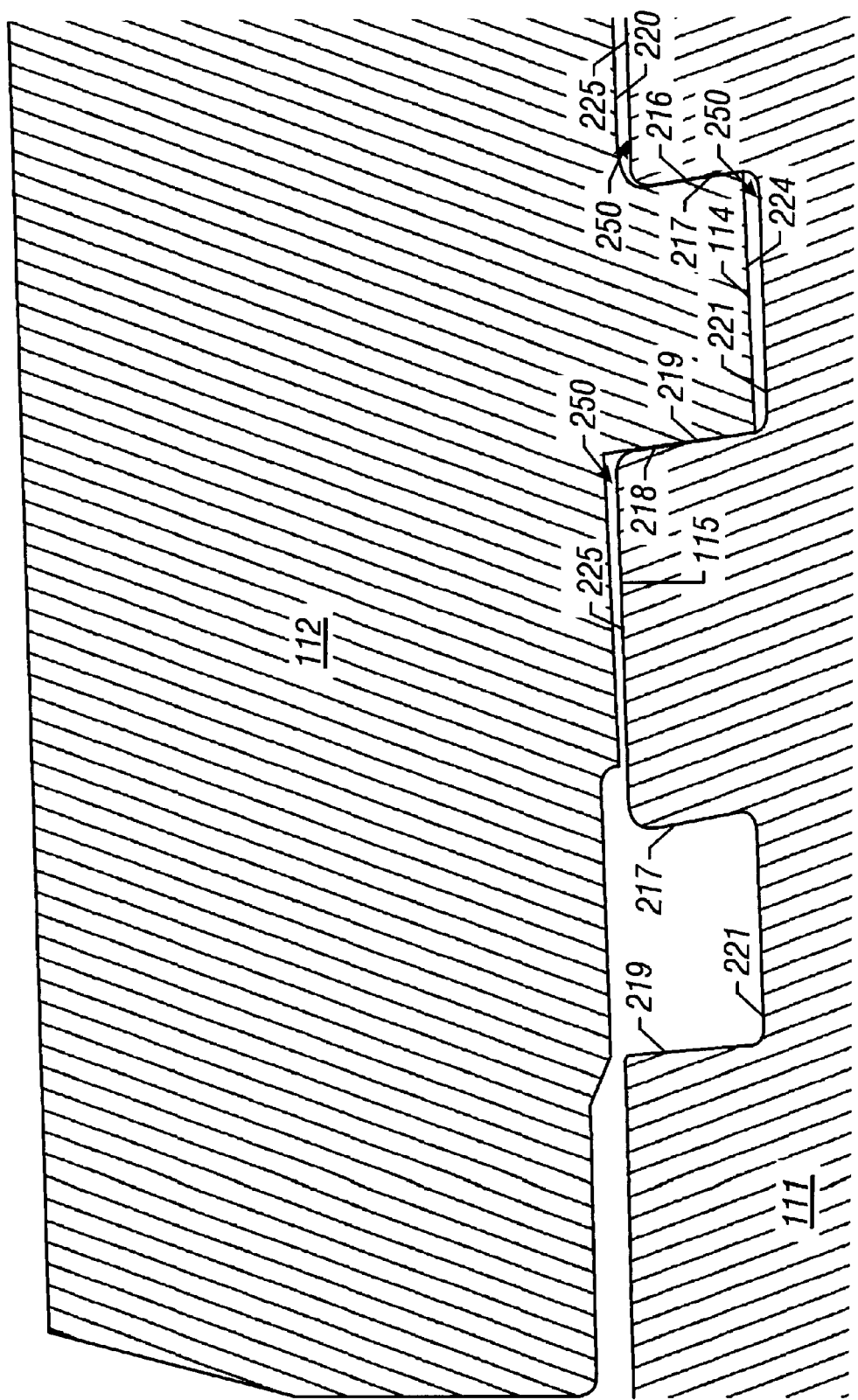
FIG. 4 is an enlarged cross section of a tubular joint in accordance with an embodiment of the invention at the point of engagement between a pin member crest and a box member root in the thin section of the box member.

Referring to the drawings wherein like reference characters are used for like parts throughout the several views, FIGS. 2, 3, and 4 illustrate a wedge-like thread connection or pipe joint, generally referenced by numeral 110, in accordance with an embodiment of the invention.

Internal thread 114 of box member 112 is formed in a two-step wedge configuration having a smaller step, as shown in FIG. 3, and a larger step, as shown in FIG. 4, each with stab flanks 118 and 218, load flanks 116 and 216, roots 120 and 220, and crests 124 and 224, where the elements in the larger step have numbers increased by 100. The thread increases in width progressively at a uniform rate in one direction substantially the entire helical length of thread 114. External thread 115 of pin member 111 is formed in a two-step wedge configuration having a smaller step, as shown in FIG. 4, and a larger step, as shown in FIG. 3, each with stab flanks 119 and 219, load flanks 117 and 217, roots 121 and 221, and crests 125 and 225, where the elements in the larger step have numbers increased by 100. The thread increases in width progressively at a uniform rate in the other direction substantially the entire helical length of thread 115. The oppositely increasing thread widths and the taper of the threads 114 and 115 cause the complementary flanks, roots, and crests of the respective threads to move into forcible engagement during rotational make-up of the connection and form sealing surfaces that resist the flow of fluids between the threads upon rotational make-up of the connection.

As shown in FIG. 2, the larger step defines a thinner section 129 of box member 112 and the smaller step defines a thicker section 130. The opposite is true for pin member 111, where the larger step defines a thicker section and the smaller step defines a thinner section. The pin member 111 or the box member 112 defines the longitudinal axis 113 of the made-up connection 110. The roots and crests of the box and pin members are flat and parallel to the longitudinal axis of the connection and have sufficient width to prevent any permanent deformation of the threads when the connection is made up.

As used herein, and as conventionally understood where tubular joints are being connected in a vertical position such as when making up a pipe string for lowering into a well bore, the term "load flank" designates the side wall surface of a thread that faces away from the outer end of the respective pin or box member on which the thread is formed and supports the weight of the lower tubular member hanging in the well bore. The term "stab flank" designates that side wall surface of the thread that faces toward the outer end of the respective pin or box member and supports the weight of the upper tubular member during the initial make-up of the joint.

An angle alpha is formed between stab flank wall 118 and root wall 120 of the smaller step of thread structure 114 and similarly on the larger step where the element numbers increase by 100. The angle alpha is also formed between stab flank wall 119 and root wall 121 of the smaller step of thread structure 115, and similarly on the larger step where the element numbers increase by 100. Load flank wall 116 and root wall 120 of the smaller step of thread 114, as well as load flank wall 117 and root wall 121 of the smaller step of thread 115, form a second angle beta. Again, beta is also defined on the larger step of thread 114 and thread 115 where the element numbers increase by 100. The angles alpha and beta are preferably acute angles to provide dovetail shaped threads. However, it should be realized that a semi-dovetail shaped thread can be provided by defining one of the angles, alpha or beta, as ninety (90) degrees, thus making the appropriate flank wall perpendicular or normal to longitudinal axis 113 of connection 110.

As shown in FIG. 3, roots 120 and crests 124 on the smaller step of on box member 112 are dimensioned to eliminate radial clearance with complementary roots 121 and crests 125 on the smaller step of pin member 111 during make-up of connection 110. In other words, thread roots 120 and thread crests 124 of box member 112 come into interference contact with the corresponding thread surfaces of pin member 111, upon making the joint hand tight. The smaller thread step maintains the thread diameter interference required to effect a pressure seal when the joint has been made up in the section where the thicker box member 130 provides more hoop support.

As shown in FIG. 4, roots 220 and crests 224 on the larger step of box member 112 are dimensioned to leave radial clearance 250 between complementary roots 221 and crests 225 on the larger step of pin member 112 during make-up of connection 110. In other words, thread roots 220 and thread crests 224 of box member 112 remain in clearance from the corresponding thread surfaces of pin member 111, upon making the joint hand tight. Clearance 250 allows the larger thread step to add structural support to the smaller step without inducing detrimental high hoop stresses in the thinner section of the box member 129.

EXAMPLE 1

Two samples of the Series 500 Wedge Thread drill pipe tool joint were subjected to multiple assemblies to evaluate the stresses in the connection as a result of make-up. The connection tested was the WT38. The first sample (#1) consisted of an existing design. The second sample (#2) was an embodiment of the present invention.

Figure 5:
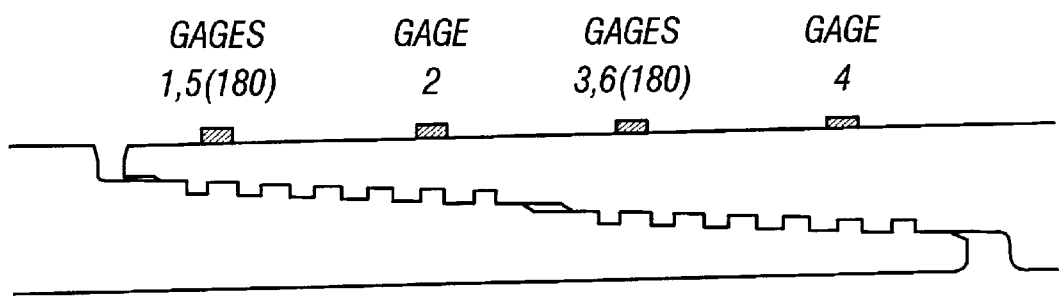
FIG. 5 is a side view of a made-up pin member external thread structure and a box member internal thread structure with strain gage locations shown.

A total of six bi-axial strain gages were placed on the outer diameter (OD) of each box. The locations of the gages were in the area of highest hoop stress as determined by Finite Element Analysis. Four gages were located at the zero degree (0°) circumferential reference, one at the thread start of each step, and one at the thread end. Two additional gages were located 180 degrees (180°) opposite the thread start gages of each step. (See FIG. 5)

Sample One—Original Design

Figure 6A:
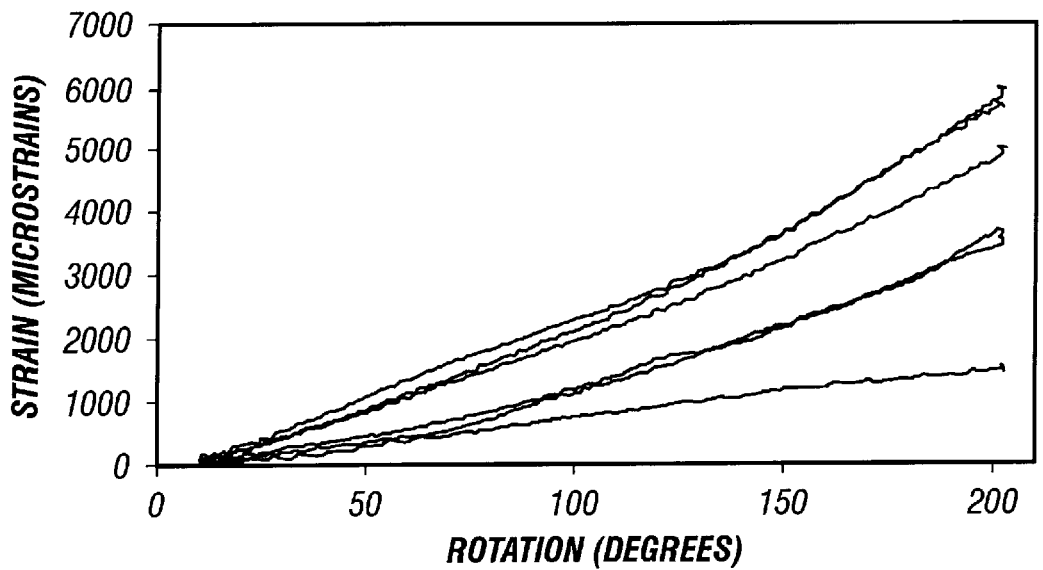
FIG. 6a is a plot of hoop strain versus rotation curves for a prior art design.

On the first make-up, the strain gages indicated the highest hoop strains (over 6000 microstrains) in the center of the connection. The sample was broken out and inspected. A check of the strain gages after breakdown did indicate that the OD of the tool joint had been yielded. Make-ups continued until 20 make and breaks had been completed. Testing on sample 1 was halted at this point. A chart of the first make-up showing the strain gage values as a function of the rotation can be found in FIG. 6*a*.

Sample Two—Modified Design

Figure 6B:
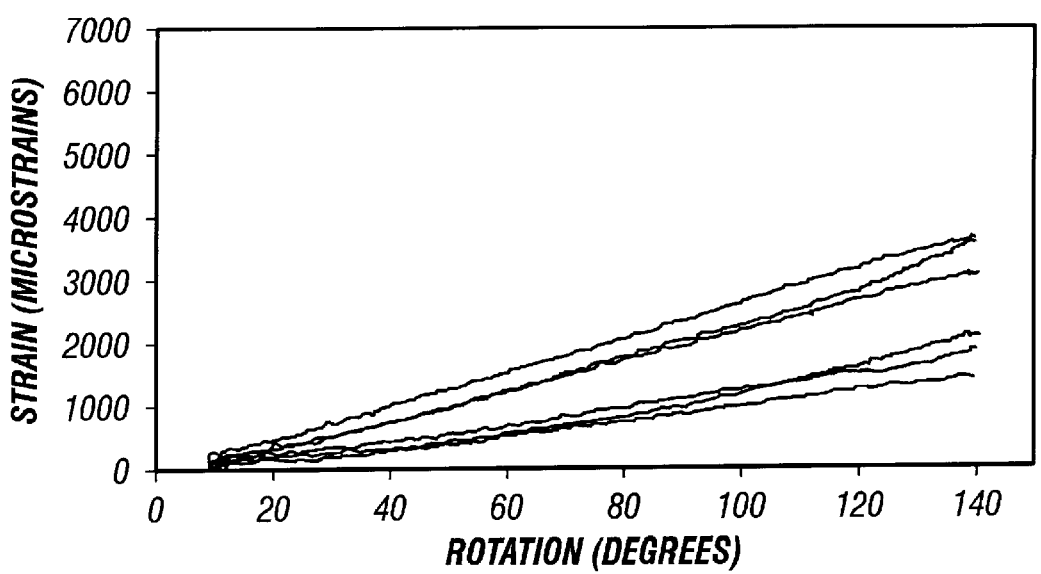
FIG. 6b is a plot of hoop strain versus rotation curves for an embodiment of the invention.
Figure 7:
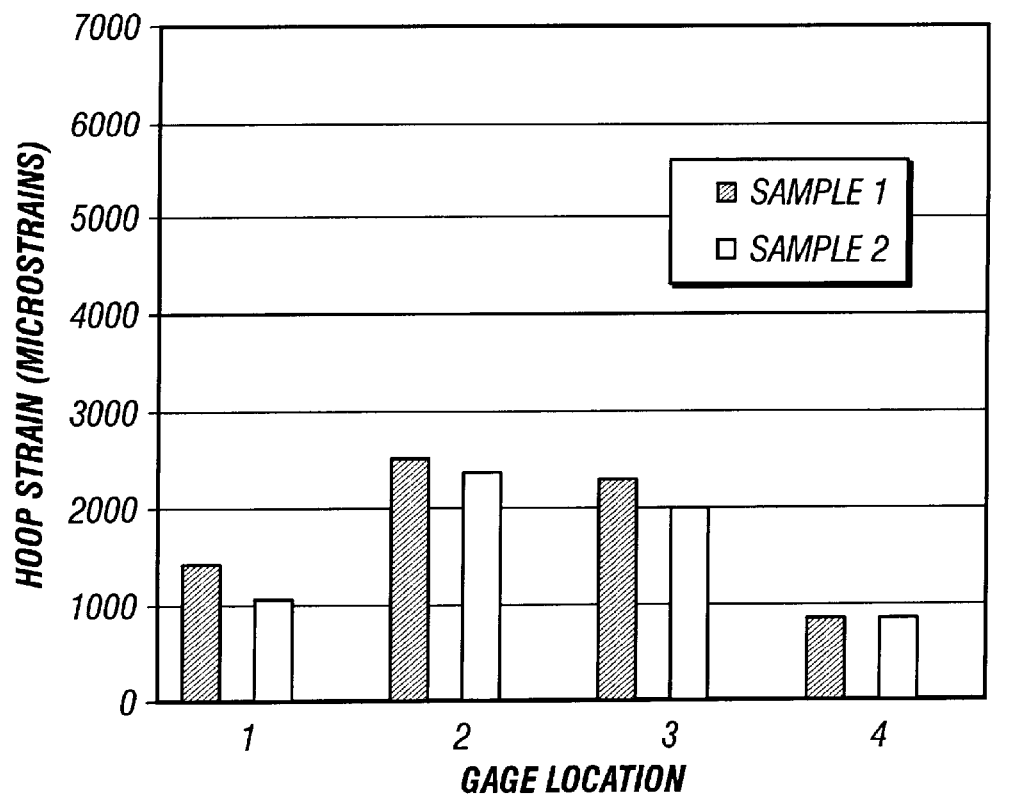
FIG. 7 is a chart showing an average hoop strain comparison for 5,000 ft-lbs of torque.
Figure 7:
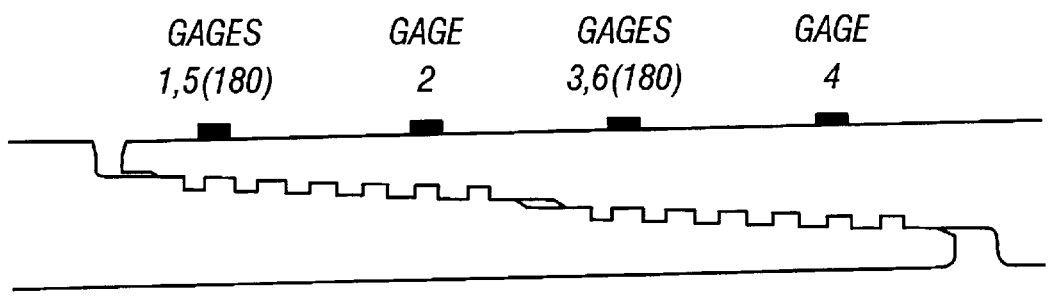
Figure 8:
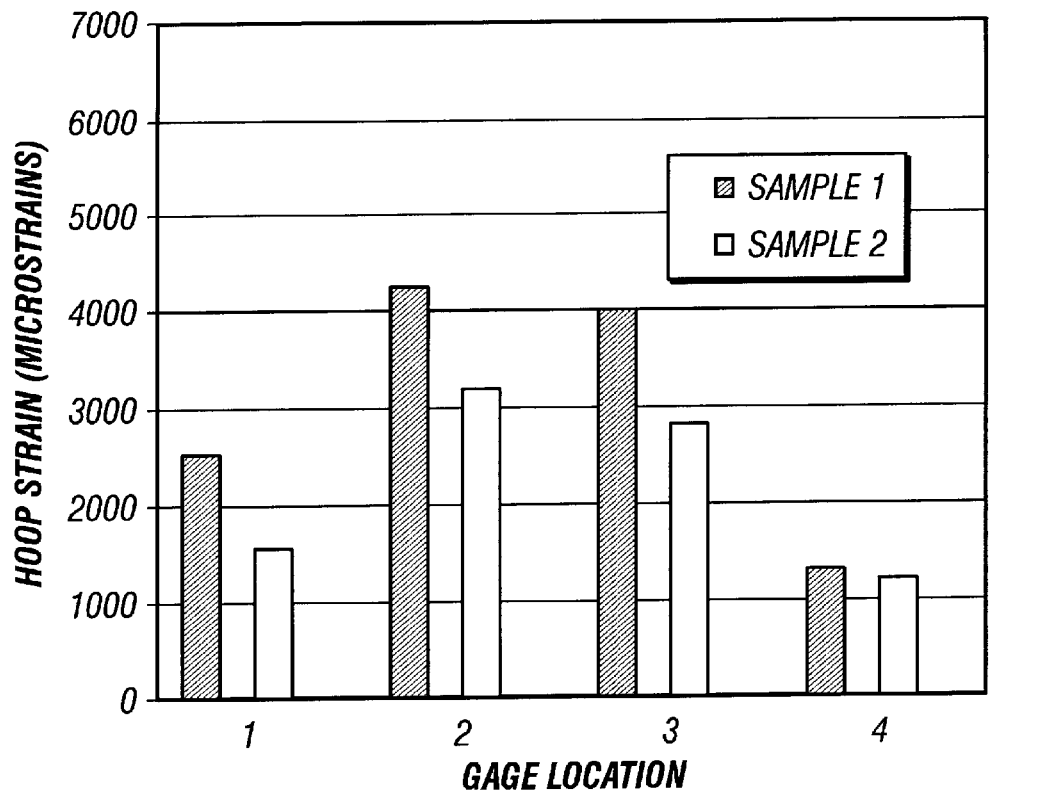
FIG. 8 is a chart showing an average hoop strain comparison fog 10,000 ft-lbs of torque.
Figure 8:
Figure 9:
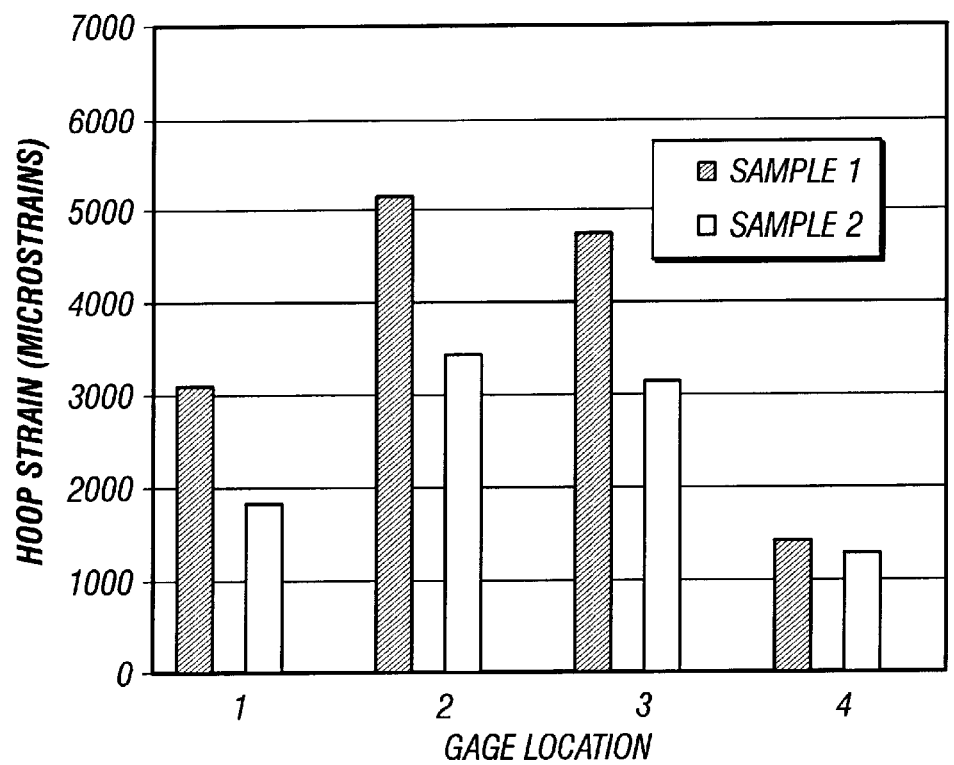
FIG. 9 is a chart showing an average hoop strain comparison for 15,000 ft-lbs of torque.
Figure 9:
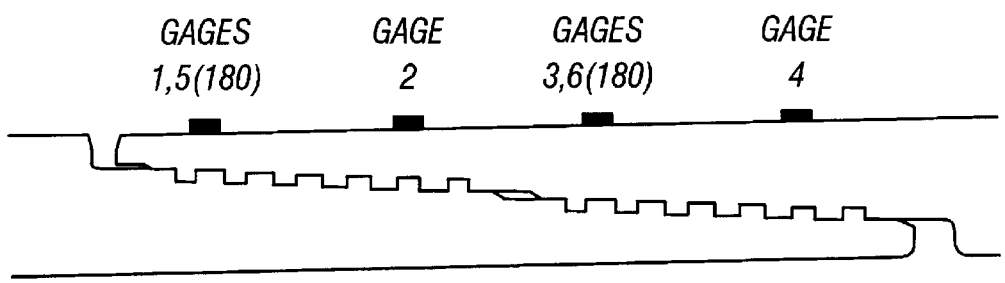
Figure 10:
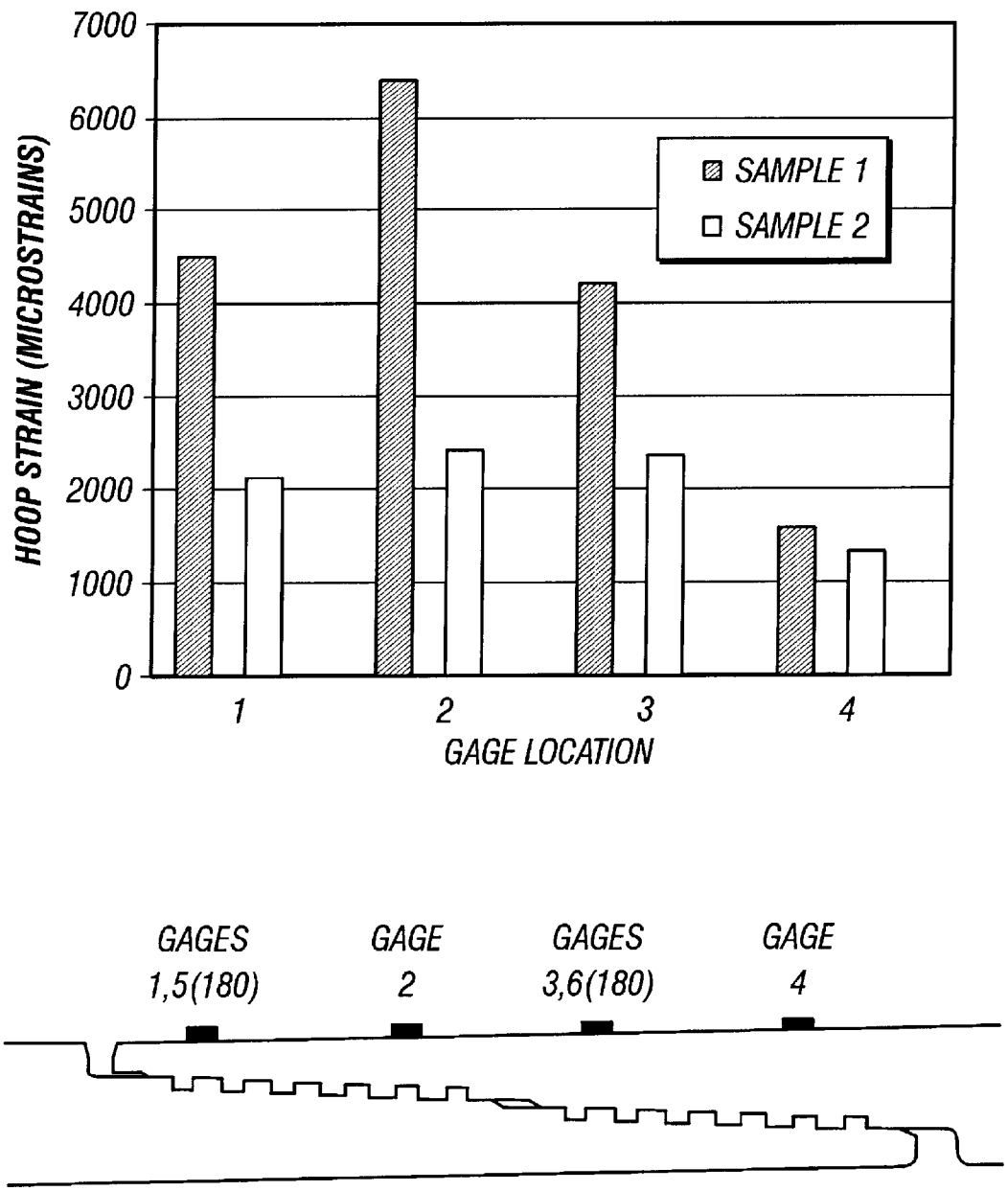
FIG. 10 is a chart showing an average hoop strain comparison for 20,000 ft-lbs of torque.

The modified design represents an embodiment of the present invention. One the first make-up, the hoop strains were much lower than in sample 1 (3500 versus 6000). The sample was broken out and inspected. The strain gages did indicate some slight yielding of the OD in the center of the connection. A chart showing the strain gage values as a function of rotation for the first make-up can be found in FIG. 6*b*.

In order to test the make and break capabilities of the modified design the sample was made-up and broken out 100 times. For make ups 2 through 10 target torque was 16,000 ft-lbs. A make-up torque of 20,000 ft-lbs was used for 11 through 20, and 23,000 ft-lbs was used for 21 through 100.

Figure 11:
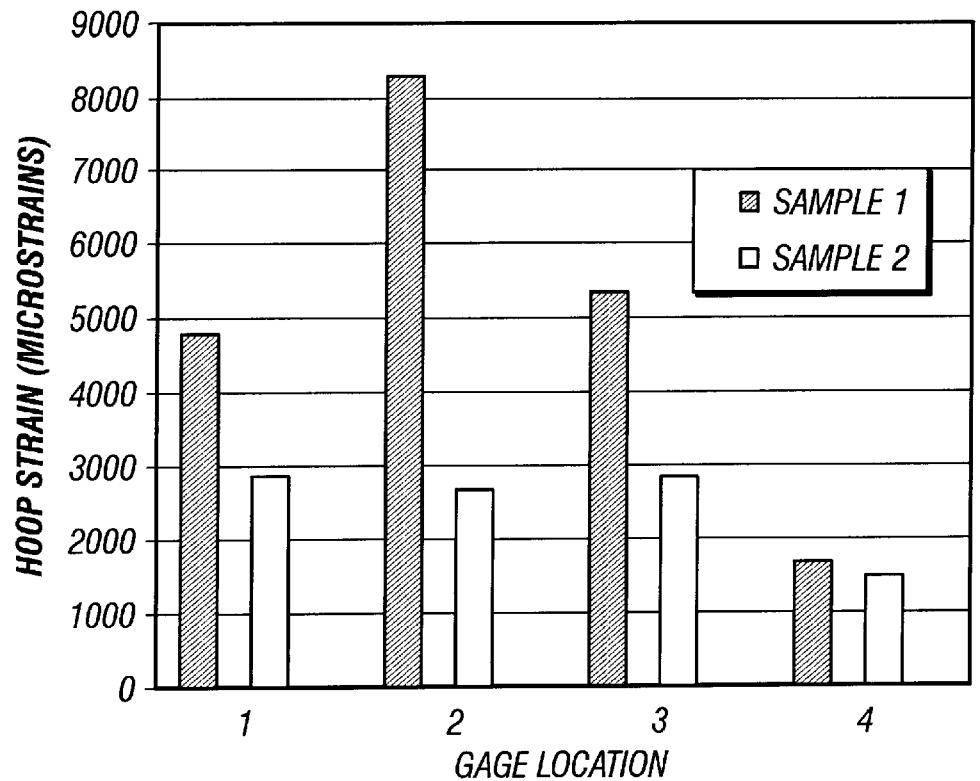
FIG. 11 is a chart showing an average hoop strain comparison for 23,000 ft-lbs of torque.
Figure 11:
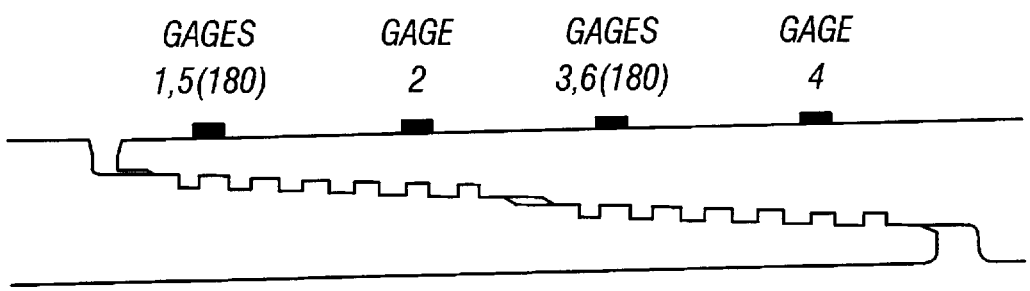

The test was designed to evaluate the reduction in box hoop stresses during make-up, as a result of the reduction in thread diameter interference. FIGS. 7–10 contain a series of bar charts that compare the average hoop strains of the original (#1) and modified (#2) connection at 5,000; 10,000; 15,000; and 20,000 foot-pounds of torque. The box hoop stresses are lower for the modified connection in each case. An additional bar chart in FIG. 11 shows that the average box hoop stresses in Sample 2 are still significantly lower after 51 make and breaks than those in Sample 1 after 19 make and breaks.

Figure 12:
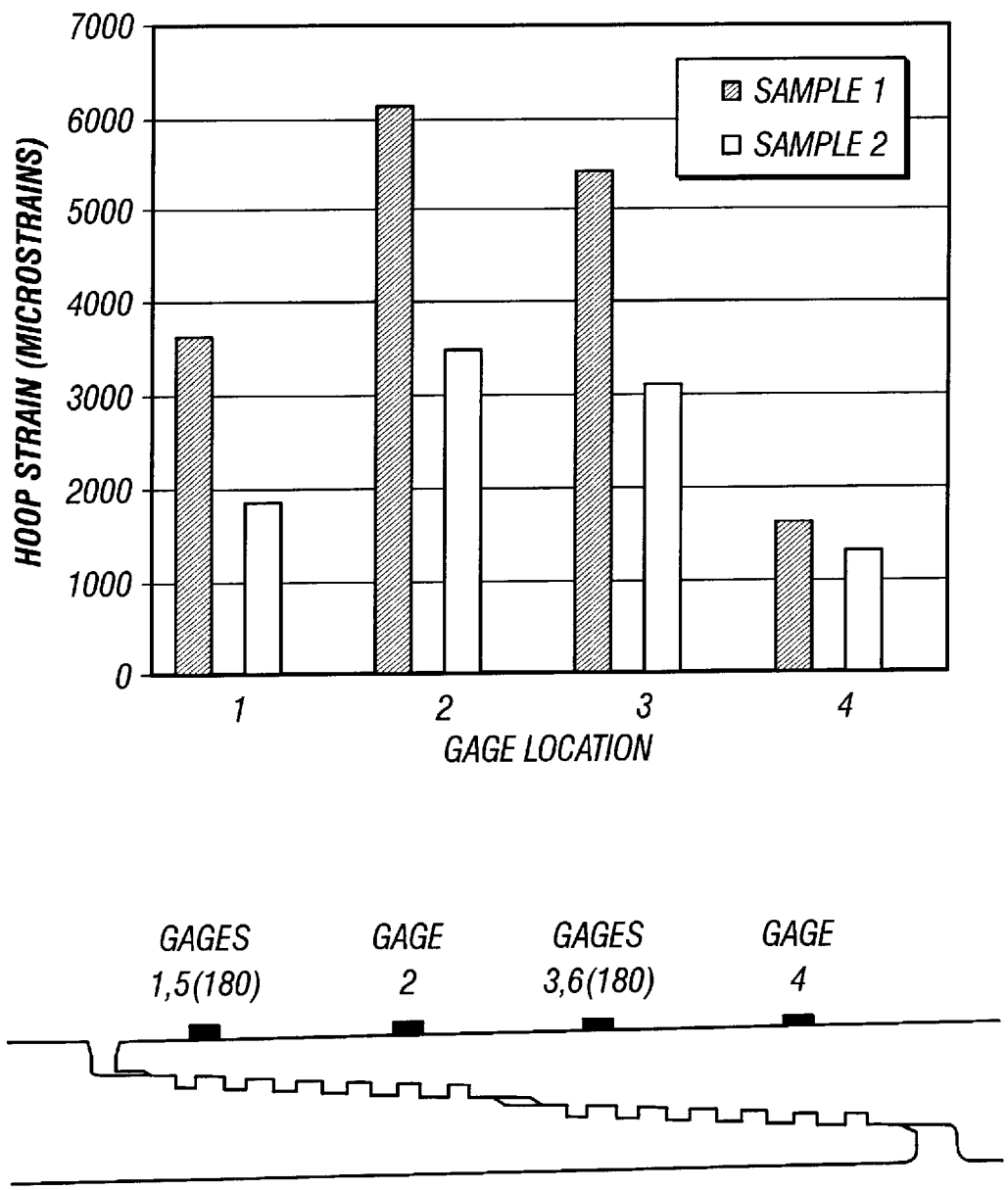
FIG. 12 is a chart showing an average hoop strain comparison for make-up 1.
Figure 13:
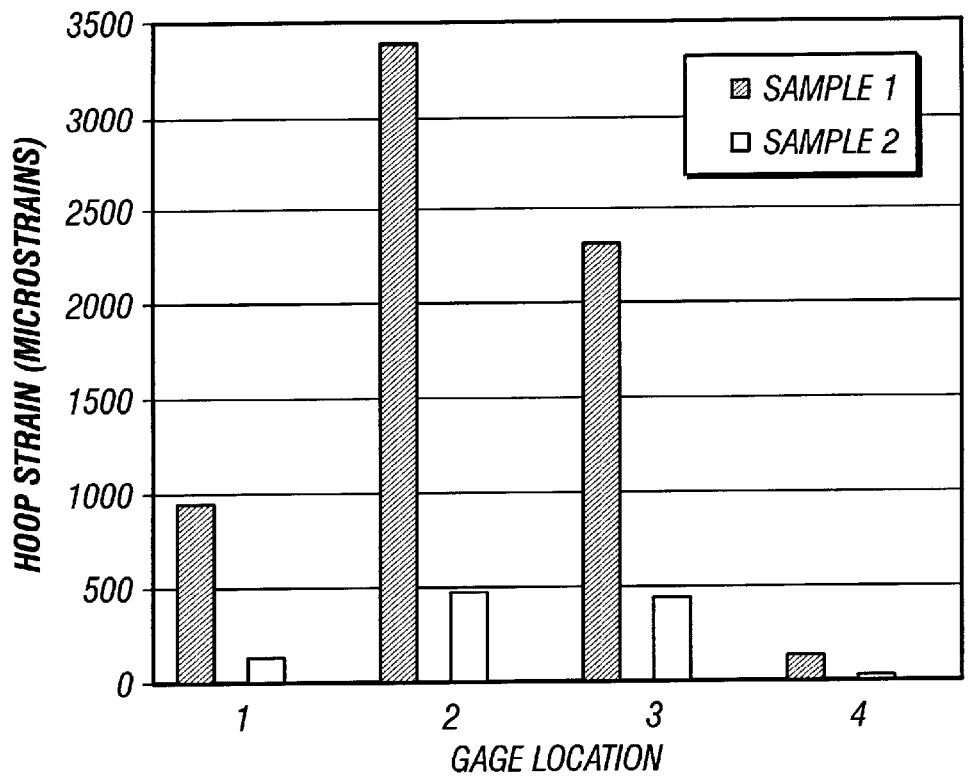
FIG. 13 is a chart showing an average hoop strain comparison for break-out 1.
Figure 13:

FIG. 12 is a bar graph showing the comparison of the average box hoop strain gages for make-up number 1. The strains for the connection have been reduced by approximately 40%. A second bar graph (FIG. 13) shows the average amount of residual strain after the sample has been broken out. These strains have been reduced by approximately 80%.

Figure 14A:
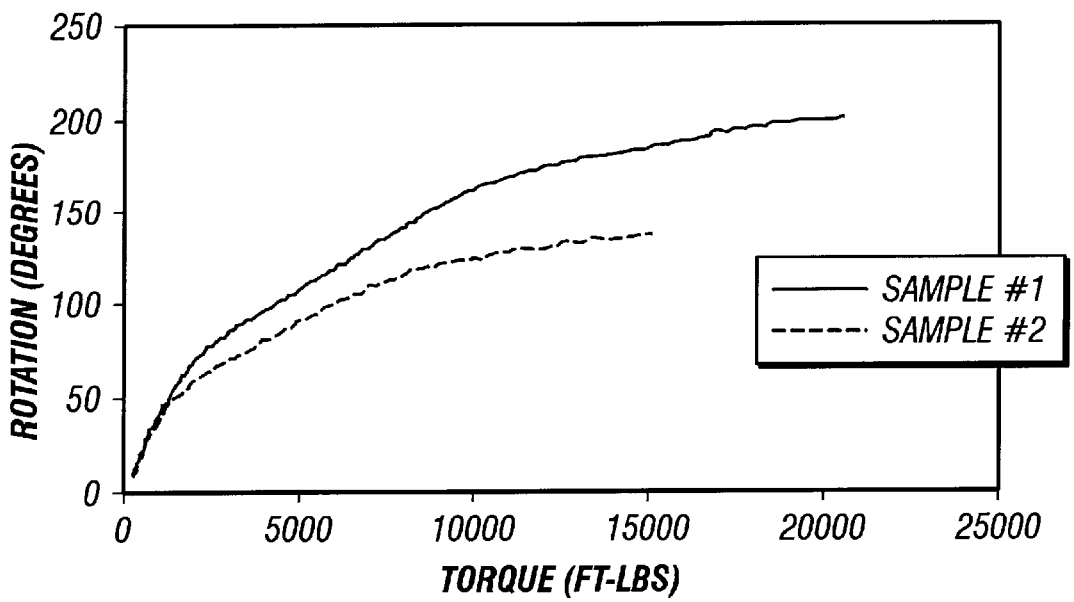
FIG. 14a is a plot of assembly curves for make-up's number 1.
Figure 14B:
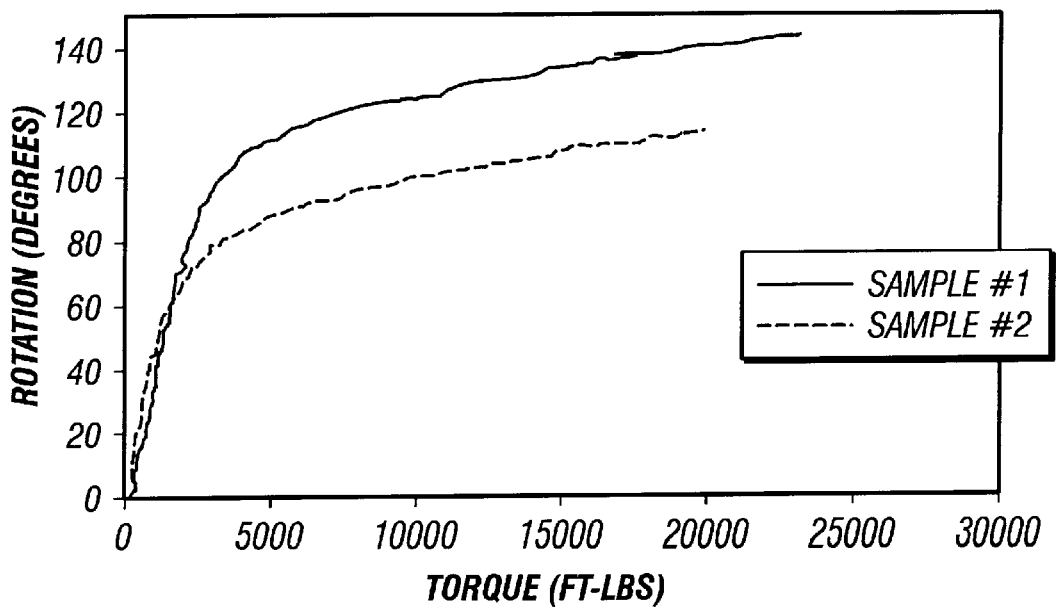
FIG. 14*b* is a plot of assembly curves for make-up's number 15.

The testing indicated an additional improvement in the connection as a result of the modifications. The decrease in the interference reduced the rotation from hand tight to power tight. This reduces the time required for make-up. FIG. 14a and 14b show torque turn graphs for the first and fifteenth make-ups of each sample.

From the foregoing it will be seen that this invention is one well adapted to attain all of the ends and objects hereinabove set forth, together with other advantages which are obvious and which are inherent to the disclosed apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

While the present invention has been described with respect to a limited number of preferred embodiments, those skilled in the art will appreciate numerous modifications and variations therefrom. The appended claims are intended to cover all such modifications and variations which occur to one of ordinary skill in the art.

What is claimed is:

1. A threaded pipe connection, comprising:
   a box member having a tapered, internal, generally dovetail-shaped thread incorporated in a two-step wedge configuration such that there exists a smaller step and a larger step each with stab flanks, load flanks, roots, and crests, the internal thread increasing in width in one direction; and
   a pin member having a tapered, external, generally dovetail-shaped thread incorporated in a two-step wedge configuration such that there exists a smaller step and a larger step each with stab flanks, load flanks, roots, and crests, the external thread increasing in width in the other direction so that the complementary stab flanks, load flanks, roots, and crests of the respective threads move into engagement during rotational make-up of the connection, and form sealing surfaces that resist flow of fluids between the threads on the smaller step of the box member and the smaller step of the pin member upon rotational make-up of the connection, while leaving clearance between the roots and crests of the threads on the larger step of the box member and the larger step of the pin member upon rotational make-up of the connection.

2. The connection of claim 1, wherein the internal and external threads are tapered so that the complementary roots and crests move into engagement during rotational make-up of the connection and form sealing surfaces between the threads on the smaller step of the box member and the smaller step of the pin member that resist the flow of fluids between the threads upon rotational make-up of the connection, while leaving clearance between all of the roots and crests of the threads on the larger step of the box member and the larger step of the pin member.

3. The connection of claim 1, wherein the roots and crests of said box and pin members are flat and parallel to a longitudinal axis of the connection.

4. The connection of claim 1, wherein the roots and crests of said box and pin members have sufficient width to prevent any permanent deformation of the threads when the connection is made up.

5. The connection of claim 1, wherein the roots and crests of the threads on the smaller step are adapted to move into engagement before both the load flanks and stab flanks move into engagement to complete the sealing of the connection.

6. The connection of claim 1, wherein one of the stab flanks and load flanks is moved into engagement as said pin member is moved into said box member by relative rotation of said members, the roots and crests of the threads on the smaller step are moved into engagement during rotational make-up of the connection, and the other of the stab flanks and load flanks is moved into engagement upon rotational make-up of the connection.

7. The connection of claim 1, wherein the stab flanks are moved into engagement as said pin member is moved into said box member by relative rotation of said members, the roots and crests are moved into engagement during rotational make-up of the connection, and the load flanks move into engagement upon rotational make-up of the connection.

8. A method of reducing stress in a threaded pipe connection, comprising:
   providing a box member having a tapered, internal, generally dovetail-shaped thread incorporated in a two-step wedge configuration such that there exists a smaller step and a larger step each with stab flanks, load flanks, roots, and crests, the internal thread increasing in width in one direction; and
   providing a pin member having a tapered, external, generally dovetail-shaped thread incorporated in a two-step wedge configuration such that there exists a smaller step and a larger step each with stab flanks, load flanks, roots, and crests, the external thread increasing in width in the other direction so that the complementary stab flanks, load flanks, roots, and crests of the respective threads move into engagement during rotational make-up of the connection, and form sealing surfaces that resist flow of fluids between the threads on the smaller step of the box member and the smaller step of the pin member upon rotational make-up of the connection, while leaving clearance between the roots and crests of the threads on the larger step of the box member and the larger step of the pin member upon rotational make-up of the connection.

9. The method of claim 8, further comprising tapering the internal and external threads so that the complementary roots and crests move into engagement during rotational make-up of the connection and form sealing surfaces between the threads on the smaller step of the box member and the smaller step of the pin member that resist the flow of fluids between the threads upon rotational make-up of the connection, while leaving clearance between all of the roots and crests of the threads on the larger step of the box member and the larger step of the pin member.

10. The method of claim 8, further comprising:
providing the roots and crests of the larger and smaller steps of the box and pin members flat and parallel to a longitudinal axis of the connection.

11. The method of claim 8, further comprising:
providing the roots and crests of the larger and smaller steps of the box and pin members with sufficient width to prevent any permanent deformation of the threads when the connection is made up.

12. The method of claim 8, further comprising:
adapting the roots and crests of the threads on the smaller step to move into engagement before both the load flanks and stab flanks move into engagement to complete the sealing of the connection.

13. The method of claim 8, further comprising:
moving one of the stab flanks and load flanks into engagement as the pin member is moved into the box member by relative rotation of the members;
moving the roots and crests of the threads on the smaller step into engagement during rotational make up of the connection; and
moving the other of the stab flanks and load flanks into engagement upon rotational make up of the connection.

14. The method of claim 8, further comprising:
moving the stab flanks into engagement as the pin member is moved into the box member by relative rotation of the members;
moving the roots and crests of the threads on the smaller step into engagement during rotational make up of the connection; and
moving the load flanks into engagement upon rotational make up of the connection.

\* \* \* \* \*